US009633618B2

(12) United States Patent
Kwak et al.

(10) Patent No.: US 9,633,618 B2
(45) Date of Patent: Apr. 25, 2017

(54) DEVICE AND METHOD OF MODIFYING IMAGE SIGNAL

(71) Applicant: Samsung Display Co., Ltd., Yongin, Gyeonggi-Do (KR)

(72) Inventors: Young-Sun Kwak, Cheonan-si (KR); Kyung Won Kang, Cheonan-si (KR); Ji Hyun Kim, Seoul (KR); Hyeon-Do Park, Anyang-si (KR); Won Jin Seo, Seoul (KR); Jun-Ho Hwang, Asan-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 516 days.

(21) Appl. No.: 14/281,388

(22) Filed: May 19, 2014

(65) Prior Publication Data

US 2014/0347384 A1 Nov. 27, 2014

(30) Foreign Application Priority Data

May 21, 2013 (KR) ........................ 10-2013-0057288

(51) Int. Cl.
*G09G 5/02* (2006.01)
*G09G 3/36* (2006.01)
(Continued)

(52) U.S. Cl.
CPC ............. *G09G 3/3648* (2013.01); *G09G 5/04* (2013.01); *G09G 5/06* (2013.01);
(Continued)

(58) Field of Classification Search
CPC .......... G09G 3/3648; G09G 5/04; G09G 5/06; G09G 2320/0242; G09G 2320/0276; G09G 2330/12; G09G 2360/16
See application file for complete search history.

(56) References Cited

U.S. PATENT DOCUMENTS 7,042,247 B1 * 5/2006 Pedersen ............ H03K 19/1737 326/38
7,663,475 B2 * 2/2010 Kudo ..................... B60Q 9/008 340/435

(Continued)

FOREIGN PATENT DOCUMENTS

KR 10-2003-0076756 A 9/2003
KR 10-2007-0080100 A 8/2007

(Continued)

*Primary Examiner* — Amara Abdi
(74) *Attorney, Agent, or Firm* — Knobbe Martens Olson & Bear LLP

(57) ABSTRACT

An image signal modifying method is disclosed. In one aspect, the image signal modifying method includes inputting a gray level interval of a first dynamic capacitance compensation (DCC) lookup table to a current gray level which is a target in a previous image signal when it is overdriven (DTG) and 0 to a gray level of the previous image signal (PIG). The method also includes searching for a data value in an adaptive color correction (ACC) lookup table corresponding to a gray level equal to a numerical value of the DTG (ALT) and performing an algorithm based on the DTG, the ALT, and the gray level interval of the first DCC lookup table. The method further includes generating a second DCC lookup table based on the algorithm, and performing second DCC processing on the input image signal based on the second DCC lookup table.

18 Claims, 6 Drawing Sheets

(51) Int. Cl.
*G09G 5/04* (2006.01)
*G09G 5/06* (2006.01)

(52) U.S. Cl.
CPC ............... *G09G 2320/0242* (2013.01); *G09G 2320/0276* (2013.01); *G09G 2330/12* (2013.01); *G09G 2360/16* (2013.01)

(56) References Cited

U.S. PATENT DOCUMENTS

2003/0179170 A1* 9/2003 Lee ...................... G09G 3/3648 345/87
2005/0062703 A1* 3/2005 Lee ...................... G09G 3/3648 345/89
2007/0285349 A1* 12/2007 Hong ................... G09G 3/3406 345/38
2008/0084432 A1* 4/2008 Jeon ..................... G09G 3/3611 345/690
2008/0246779 A1* 10/2008 Lee ......................... G06T 5/009 345/690
2009/0109247 A1* 4/2009 Kimura ................ G09G 3/3666 345/690
2009/0295840 A1* 12/2009 Park ..................... G09G 3/3611 345/690
2010/0020112 A1* 1/2010 Jeon ..................... G09G 3/3648 345/690
2010/0156949 A1* 6/2010 Park ..................... G09G 3/3607 345/690
2012/0320019 A1* 12/2012 Jeong ................... G09G 3/2096 345/211

FOREIGN PATENT DOCUMENTS

KR 20070080100 * 8/2007 ............. G02F 1/133
KR 10-2009-0125564 A 12/2009

* cited by examiner

DEVICE AND METHOD OF MODIFYING IMAGE SIGNAL

CROSS-REFERENCE TO RELATED APPLICATIONS

This application claims priority to and the benefit of Korean Patent Application No. 10-2013-0057288 filed in the Korean Intellectual Property Office on May 21, 2013, the entire contents of which are incorporated herein by reference.

BACKGROUND

Field

The described technology generally relates to an image signal modifying device and an image signal modifying method.

Description of the Related Technology

Liquid crystal displays generally include two display panels on which field generating electrodes are formed and a liquid crystal layer interposed therebetween. Typically, liquid crystal displays operate by applying a voltage to the field generating electrodes to generate an electric field in the liquid crystal layer in order to adjust the configuration of liquid crystal molecules and control the polarization of the incident light in order to display images.

Liquid crystal displays generally include pixels having a switching element such as a thin film transistor (TFT) and a display panel which is controlled by display signal lines such as gate lines and data lines. The thin film transistor serves as a switching element which either transmits a data voltage from the data line to the pixel or blocks the data voltage in accordance with a gate signal received from the gate line.

A liquid crystal capacitor generally includes a pixel electrode and a common electrode and a liquid crystal layer disposed between the two electrodes functions as a dielectric material. A data voltage is applied to the pixel electrode and a common voltage is applied to the common electrode to apply a charging voltage (also referred to as a pixel voltage) across the liquid crystal capacitor. The arrangement of the liquid crystal molecules in the liquid crystal layer is based on the magnitude of the pixel voltage and determines the polarization of light passing through a liquid crystal layer. The change in the polarization affects a change in the transmittance of light through a polarizer attached to the liquid crystal display and thus the luminance of the pixels may be controlled to reflect the gray level of an image signal.

However, the response speed of the liquid crystal molecules is relatively slow, since it takes time to reach a desired pixel voltage in the liquid crystal capacitor, it will also take time to reach the desired luminance. Therefore, when the difference between the target voltage and the previous voltage applied to the liquid crystal capacitor is large, the voltage applied to the liquid crystal capacitor may not reach the target voltage while the switching element is turned on.

One method to improve the response speed of the liquid crystal without changing its physical properties is a dynamic capacitance compensation (DCC, hereinafter referred to as DCC) method. The DCC method uses the fact that when the voltage at both ends of the liquid crystal capacitor is increased, the charging speed is increased. Therefore, the data voltage applied to the pixel (the difference between the data voltage and the common voltage, for convenience, the common voltage is assumed to be zero) is set to be higher than the target voltage, shortening the time required for the voltage in the liquid crystal capacitor to reach the target voltage.

Typically, DCC processing is performed on the image signal after performing adaptive color correction (ACC, hereinafter abbreviated as ACC). However, when a pixel is overdriven from a low gray level to a high gray level, the ACC lookup table (LUT, hereinafter referred to as LUT) is changed during the ACC processing. In this case, if a predetermined DCC LUT is used, it is difficult to precisely control the desired gray level.

Accordingly, if the ACC LUT is changed, there is a need for a device and a method which modifies the data of the DCC LUT in accordance with the change.

The above information disclosed in this Background section is only intended to facilitate understanding of the background of the described technology and therefore it may contain information that does not form the prior art that is already known in this country to a person of ordinary skill in the art.

SUMMARY OF CERTAIN INVENTIVE ASPECTS

The described technology has been developed in an effort to provide an image signal modifying device and an image signal modifying method which changes or generates data for a DCC LUT when an ACC LUT is changed.

One inventive aspect is an image signal modifying device including: a first DCC lookup table; an ACC lookup table; and an algorithm computing unit which performs an algorithm based on the ACC lookup table and the first DCC lookup table to generate a second DCC lookup table.

The algorithm computing unit may perform an algorithm based on a data value in the ACC lookup table corresponding to a gray level of a numerical value which is equal to a numerical value of a current gray level which is a target in a previous image signal when it is overdriven and a current gray level which is a target in the previous image signal when it is overdriven.

The algorithm calculation may be performed based on Equation 1.

$$F=\{A-(\text{gray level interval of the first } DCC\ LUT)\}+\{(B-C)*(ALT-DTG)\}/\{\text{gray level interval of the first } DCC\ LUT\} \quad \text{Equation 1}$$

(in Equation 1, the DTG is a current gray level which is a target in the previous image signal when it is overdriven, the ALT is a data value in the ACC lookup table corresponding to a gray level which is equal to a numerical value of the DTG, A is a value that, if the DTG is smaller than the ALT, is the DTG incremented by the gray level interval of the first DCC lookup table until larger than the ALT and, if the DTG is not smaller than the ALT, is the DTG decremented by the gray level interval of the first DCC lookup table until smaller than the ALT, B is a data value in the first DCC lookup table corresponding to A, C is a data value in the first DCC lookup table corresponding to a gray level of a numerical value obtained by subtracting 16 from a numerical value of A, and F is a data value in the second DCC lookup table corresponding to the DTG).

The algorithm computing unit may include an input unit which inputs specific numerical values to the DTG, a PIG which is a gray level of the previous image signal, or A; a searching unit which searches for the ALT in the ACC lookup table; a comparing unit which compares the DTG with the ALT or A with the ALT; a calculating unit which calculates F based on Equation 1; and a storing unit which stores the calculated F in a region of the second DCC lookup table corresponding to the DTG and the PIG. The searching unit may search for B and C in the first DCC lookup table.

The calculating unit may perform the algorithm based on Equation 1 where: if the DTG is smaller than the ALT, the DTG is incremented by the gray level interval of the first DCC lookup table until the incremented value is larger than the ALT, or if the DTG is not smaller than the ALT, the DTG is decremented by the gray level interval of the first DCC lookup table until the decremented value is smaller than the ALT.

The image signal modifying device may further include an output unit which outputs a third DCC lookup table and the second DCC processed input image signal. The output unit determines whether color tracking occurs in the second DCC processed image signal, and if color tracking occurs, third DCC processing is performed on the second DCC processed image signal based on the third DCC lookup table.

Another inventive aspect is an image signal modifying method including: inputting a gray level interval of a first DCC lookup table to a current gray level which is a target in a previous image signal when it is overdriven (DTG) and inputting 0 to a gray level of the previous image signal (PIG); searching for a data value in an ACC lookup table corresponding to a gray level of a numerical value which is equal to a numerical value of the DTG (ALT); performing an algorithm based on the DTG, the ALT, and data values of the first DCC lookup table; generating a second DCC lookup table based on the algorithm; and performing DCC processing on the image signal based on the data values stored in the second DCC lookup table.

The image signal modifying method may further include determining whether color tracking occurs in the second DCC processed input image signal; and if color tracking occurs, performing third DCC processing on the second DCC processed input image signal based on the third DCC LUT.

The generating of a second DCC lookup table based on the algorithm may further include storing the calculated F as a data value in the second DCC lookup table corresponding to the DTG and the PIG.

The storing of the calculated F may further include: adding the interval of the gray level of the first DCC lookup table to a numerical value input to the DTG; determining whether the value obtained by the adding exceeds 255; and; if the value obtained by the adding does not exceed 255, performing the algorithm again by inputting a value obtained by adding the interval of the gray level of the first DCC lookup table to the numerical value of the DTG to the DTG.

The storing of the calculated F in the second DCC lookup table may further include when the value obtained by the adding exceeds 255, performing the algorithm again by inputting a value obtained by adding the interval of the gray levels of the first DCC lookup table to the numerical value of the PIG to the PIG.

The generating of a second DCC lookup table may be applied when the ACC LUT is one of Red, Green, and Blue.

According to at least one exemplary embodiment of the described technology, an image signal modifying device and an image signal modifying method which automatically change or generate data of the DCC LUT when the ACC LUT is changed are provided.

DETAILED DESCRIPTION OF CERTAIN INVENTIVE EMBODIMENTS

The described technology will be described more fully hereinafter with reference to the accompanying drawings, in which exemplary embodiments are shown. As those skilled in the art would realize, the described embodiments may be modified in various different ways, all without departing from the spirit or scope of the described technology. Throughout the specification, "connected" includes "electrically connected."

Figure 1:
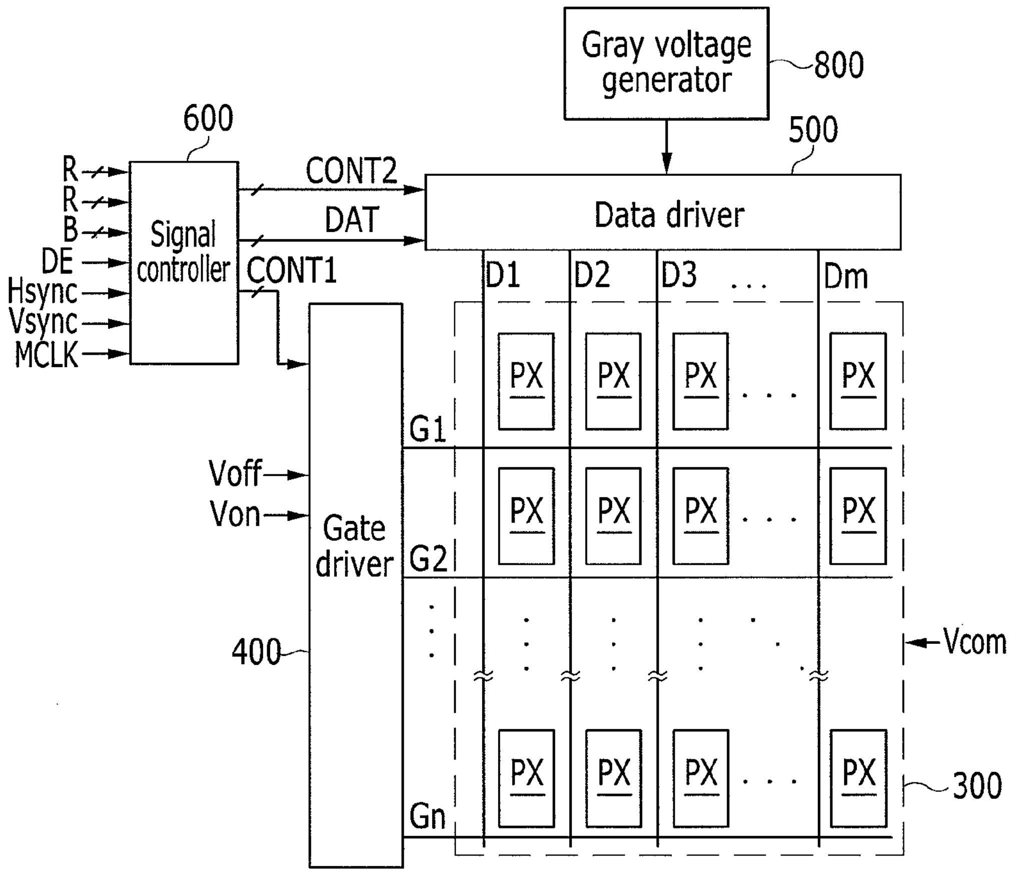
FIG. 1 is a block diagram of a liquid crystal display according to an exemplary embodiment.
Figure 2:
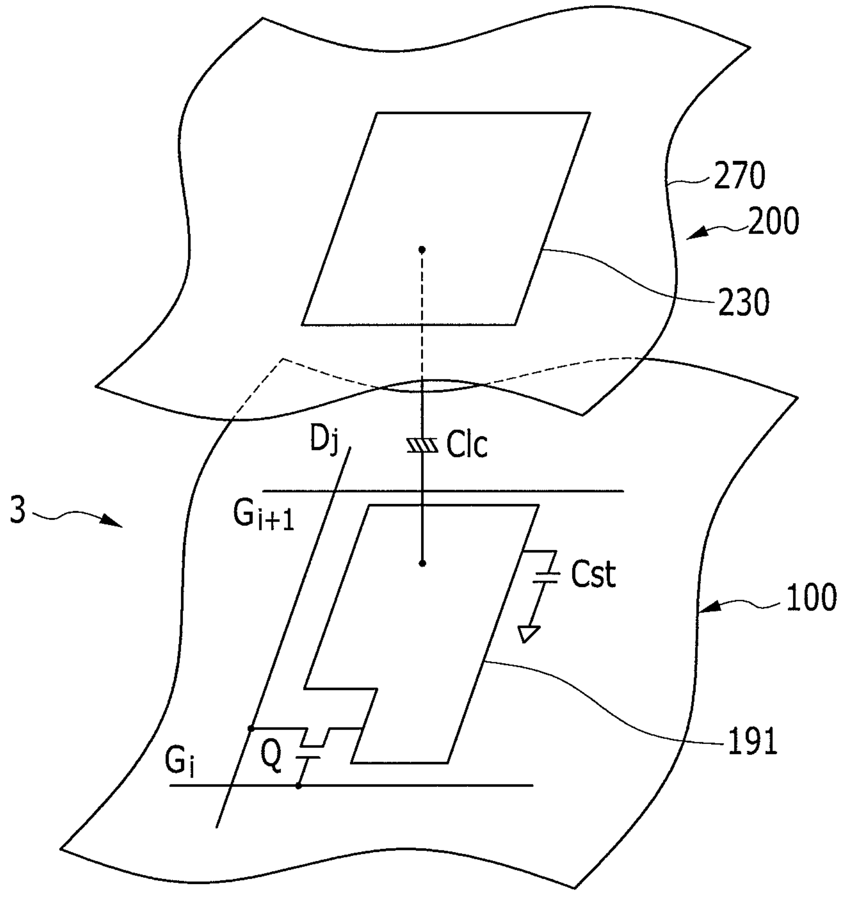
FIG. 2 is an equivalent circuit diagram of one pixel of the liquid crystal display according to an exemplary embodiment.

FIG. 1 is a block diagram of a liquid crystal display according to an exemplary embodiment of the described technology and FIG. 2 is an equivalent circuit diagram of one pixel of the liquid crystal display according to the exemplary embodiment of the described technology.

As illustrated in FIG. 1, a liquid crystal display according to an exemplary embodiment includes a liquid crystal panel assembly 300, a gate driver 400 and a data driver 500 which are connected to the liquid crystal panel assembly 300, a gray voltage generator 800 which is connected to the data driver 500, and a signal controller 600 which controls the above components.

The liquid crystal panel assembly 300 includes a plurality of signal lines G1 to Gn and D1 to Dm and a plurality of pixels PX which are connected to the signal lines and arranged in a substantially matrix form, as seen from an equivalent circuit diagram. Further, as seen from the structure illustrated in FIG. 2, the liquid crystal panel assembly 300 includes lower and upper panels 100 and 200 which face each other and a liquid crystal layer 3 interposed between the lower and upper panels.

The signal lines G1 to Gn and D1 to Dm include a plurality of gate lines G1 to Gn which transmit gate signals (also referred to as "scanning signals") and a plurality of data lines D1 to Dm which transmit data voltages. The gate lines G1 to Gn extend in a row direction substantially parallel to each other and the data lines D1 to Dm extend in a column direction substantially parallel to each other.

Each pixel PX is connected to an i-th (i=1, 2, . . . , n) gate line Gi and a j-th (j=1, 2, . . . , m) data line Dj and includes a switching element Q connected to the signal lines Gi and Dj, a liquid crystal capacitor Clc connected to the switching element, and a storage capacitor Cst. The storage capacitor Cst may be omitted.

The switching element Q is a three terminal element such as a thin film transistor and is provided in the lower panel 100. The switching element Q includes a control terminal connected to the gate line Gi, an input terminal connected to the data line Dj, and an output terminal connected to the liquid crystal capacitor Clc and the storage capacitor Cst. The thin film transistor may include polysilicon or amorphous silicon.

The liquid crystal capacitor Clc includes a pixel electrode 191 in the lower panel 100 and a common electrode 270 in the upper panel 200 as its two terminals. The liquid crystal capacitor further includes a liquid crystal layer 3 interposed between the two electrodes 191 and 270 which functions as a dielectric material. The pixel electrode 191 is connected to the switching element Q and the common electrode 270 is formed on substantially the entire surface of the upper panel 200 and a common voltage Vcom is applied to the common electrode 270. In contrast to the illustration of FIG. 2, the common electrode 270 may be provided on the lower panel 100 and in this case, at least one of the two electrodes 191 and 270 may have a line or rod shape.

The storage capacitor Cst, which functions to assist the liquid crystal capacitor Clc, is formed by a separate signal line (not illustrated) provided in the lower panel 100 which is overlapped with the pixel electrode 191 and an insulator is interposed therebetween. A predetermined voltage such as a common voltage Vcom is applied to the separate signal line. Alternatively, the storage capacitor Cst may be formed by overlapping the pixel electrode 191 and the previous gate line, which is located directly on the pixel electrode 191, with an insulator interposed therebetween.

In order to display color, each pixel PX may uniquely display a primary color (spatial division) or each pixel alternately displays primary colors at a different times (temporal division) to allow the desired color to be recognized by a spatial and temporal sum of the primary colors. Examples of primary colors include three primary colors such as red, green, and blue. FIG. 2 illustrates an example of spatial division in which each pixel PX includes a color filter 230, which corresponds to one of the primary colors, in a region of the upper panel 200 corresponding to a pixel electrode 191. That is, three pixels PX each display one of red, green and blue and together form one dot which represents one color. In contrast to FIG. 2, the color filter 230 may be provided on or below the pixel electrode 191 of the lower panel 100.

At least one polarizer (not illustrated) which polarizes light is attached to an outer surface of the liquid crystal panel assembly 300.

Referring back to FIG. 1, the gray voltage generator 800 generates two sets of gray voltage groups which are related to the transmittance of the pixels PX. One of the two sets has a positive value with respect to a common voltage Vcom and the other set has a negative value. The number of gray voltages included in one set of gray voltage groups, generated by the gray voltage generator 800, may be equal to the number of gray levels which may be displayed by the liquid crystal display.

The data driver 500 is connected to the data lines D1 to Dm of the liquid crystal panel assembly 300 and selects a gray voltage from the gray voltage generator 800 and applies the gray voltage to the data lines D1 to Dm as a data voltage.

The gate driver 400 applies a gate signal formed by combinations of the gate-on voltage Von and the gate-off voltage Voff to the gate lines G1 to Gn.

Each of driving devices 400, 500, 600, 800 may be integrated in the liquid crystal panel assembly 300 together with signal lines G1 to Gn and D1 to Dm and the switching elements Q. In contrast, the driving devices 400, 500, 600, 800 may be directly mounted on the liquid crystal panel assembly 300 as at least one IC chip or may be mounted on a flexible printed circuit film (not illustrated) to be attached to the liquid crystal panel assembly 300 as a tape carrier package (TCP) or may be mounted on a separate printed circuit board (PCB) (not illustrated). Further, the driving devices 400, 500, 600, 800 may be integrated in a single chip and in this case, at least one of the driving devices or at least one circuit element which forms the driving devices may be provided outside the single chip.

The operation of the liquid crystal display will now be described in detail.

The signal controller 600 receives the input image signals R, G, and B from an external graphic controller (not illustrated) and also receives input control signals which control the displaying of the input image signals R, G, and B. The input image signals R, G and B include information on the luminance of each pixel PX and the luminance has a predetermined number of gray levels, for example, $1024=2^{10}$, $256=2^{8}$ or $64=2^{6}$ gray levels. Examples of the input control signal include a vertical synchronization signal Vsync, a horizontal synchronizing signal Hsync, a main clock MCLK, and a data enable signal DE.

The signal controller 600 generates an output image signal DAT based on the input image signals R, G, and B and the input control signal to appropriately process the output image signal DAT and generates a gate control signal CONT1, a data control signal CONT2, and an illumination control signal CONT3. Then, the signal controller 600 sends the gate control signal CONT1 to the gate driver 400 and sends the data control signal CONT2 and the processed output image signal DAT to the data driver 500.

The gate control signal CONT1 includes a scanning start signal STV which instructs the start of scanning and at least one clock signal which controls an output period of the gate-on voltage Von. The gate control signal CONT1 may further include an output enable signal OE which limits the amount of time the gate-on voltage Von is maintained.

The data control signal CONT2 includes a horizontal synchronization start signal STH which indicates the starting of transmission of the output image signal DAT to a bundle of pixels PX, and a load signal LOAD and a data clock signal HCLK which instructs the application of the data voltage to the liquid crystal panel assembly 300. The data control signal CONT2 may further include an inversion signal RVS which inverts the polarity of the data voltage with respect to the common voltage Vcom (hereinafter, the "polarity of the data signal with respect to the common voltage" will be simply referred to as the "polarity of the data signal").

In accordance with the data control signal CONT2 received from the signal controller 600, the data driver 500 receives a digital output image signal DAT for one bundle of pixels PX and selects a gray voltage corresponding to each digital output image signal DAT to convert the digital output image signal DAT into an analog data voltage and then applies the converted analog data voltage to the corresponding data lines D1 to Dm.

The gate driver 400 applies a gate-on voltage Von to the gate lines G1 to Gn in accordance with the gate control signal CONT1 received from the signal controller 600 to turn on the switching elements Q which are connected to the gate lines G1 to Gn. Then, the data voltages applied to the data lines D1 to Dm are applied to the corresponding pixels PX through the turned-on switching elements Q.

The difference between the data voltage applied to the pixels PX and the common voltage Vcom is a charged voltage applied to the liquid crystal capacitor Clc, and is also referred to as a pixel voltage. The arrangement of the liquid crystal molecules is dependent on the amplitude of the pixel voltage and thus the polarization of the light which passes through the liquid crystal layer 3 may be changed. The change of polarization affects a change in the light transmittance by a polarizer attached to the display panel assembly 300 and thus the pixel PX displays the luminance corresponding to the gray level of the image signal DAT.

The above process is repeated in units of one horizontal period (also referred to as "1H" and equal to one period of the horizontal synchronizing signal Hsync and the data enable signal DE) so that the gate-on voltage is sequentially applied to all gate lines G1 to Gn and the data voltage is applied to all pixels PX to display one frame of an image.

When one frame ends, a subsequent frame starts and the status of the inversion signal RVS which is applied to the data driver 500 is controlled such that the polarity of the data voltage applied to each pixel PX is opposite to the polarity of the voltage in the previous frame ("frame inversion"). In this case, the polarity of the data voltage which applied to one data line is inversed (for example, row inversion, dot inversion) in accordance with a characteristic of the inversion signal RVS for one frame, or the polarities of the data voltages applied to pixel rows may be different from each other (for example, column inversion, dot inversion).

Additionally, if a voltage is applied to both ends of the liquid crystal capacitor Clc, the liquid crystal molecules of the liquid crystal layer 3 are rearranged to a stable configuration in accordance with the applied voltage. In this case, the response speed of the liquid crystal molecule is relatively slow in that it takes time to reach a stable configuration. When the voltage applied to the liquid crystal capacitor Clc is continuously maintained, the liquid crystal molecules continuously move until the liquid crystal molecules reach a stable configuration and the light transmittance is likewise changed until the stable configuration is reached. When the liquid crystal molecules reach the stable configuration and are no longer in motion, the light transmittance reaches a constant state.

If the pixel voltage is stable and has reached a target pixel voltage and the light transmittance has reached a target light transmittance, the target pixel voltage and the target light transmittance are in one-to-one correspondence.

However, the amount time the switching element Q of each pixel PX is turned on to apply the data voltage may be limited such that the liquid crystal molecules cannot reach a stable configuration while the data voltage is applied. However, after the switching element Q is turned off, the voltage difference remains between both ends of the liquid crystal capacitor Clc and thus the liquid crystal molecules continue to move towards a stable configuration. As described above, when the arrangement of the liquid crystal molecules is changed, the permittivity of the liquid crystal layer 3 is changed, and thus, the capacitance of the liquid crystal capacitor Clc is changed. When the switching element Q is turned off, one terminal of the liquid crystal capacitor Clc floats. Therefore, if leakage current is not considered, the total charge stored in the liquid crystal capacitor Clc is not changed but is constantly maintained. Therefore, the change of the capacitance of the liquid crystal capacitor Clc causes the voltage between the ends of the liquid crystal capacitor Clc, or the pixel voltage, to be changed.

Accordingly, when a data voltage (hereinafter, referred to as a "target data voltage") corresponding to a target pixel voltage is applied to the pixel PX, the actual pixel voltage applied may be different from the target pixel voltage and thus the target transmittance cannot be obtained. Particularly, as the difference between the target transmittance and the initial transmittance of the pixel PX is increased, the difference between the actual pixel voltage and the target pixel voltage becomes significant.

Therefore, the data voltage applied to the pixel PX needs to be larger or smaller than the target data voltage and one method for achieving this is dynamic capacitance compensation (DCC).

Figure 3:
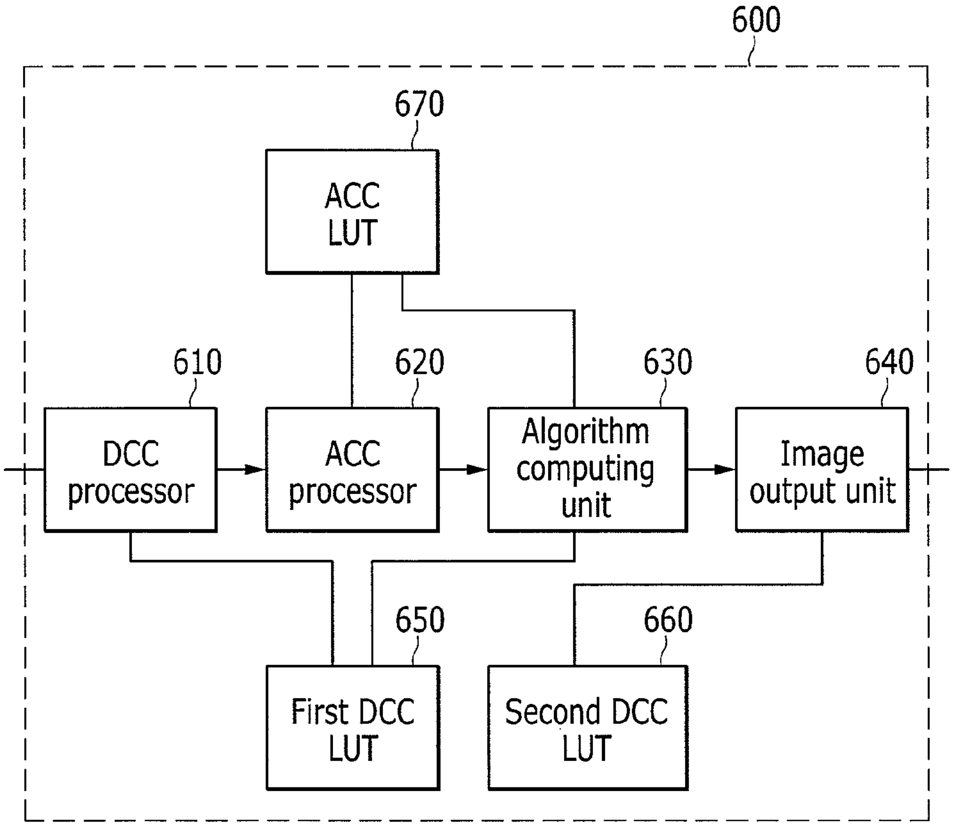
FIG. 3 is a block diagram of a signal controller according to an exemplary embodiment.

FIG. 3 is a block diagram of a signal controller according to an exemplary embodiment of the described technology.

Referring to FIG. 3, a signal controller 600 according to an exemplary embodiment will be described.

The signal controller 600 according to the present exemplary embodiment includes a DCC processor 610, an adaptive color correction (ACC) processor 620, an algorithm computing unit 630, an image output unit 640, a first DCC lookup table (DCC LUT) 650, a third DCC LUT (DCC lookup table (DCC LUT) 660 and an ACC lookup table (ACC LUT) 670.

However, the components illustrated in FIG. 3 are not all essential. A signal controller 600 which includes more or less components may also be implemented.

The DCC processor 610 performs DCC processing on the signal input to the signal controller 600. The DCC processor 610 may perform DCC processing on the signal based on the first DCC LUT 650. The DCC processor 610 according to an exemplary embodiment may directly receive input image signals R, G and B to perform the DCC processing. In this case, the output signal of the DCC processor 610 input to the ACC processor 620 and then ACC processing may be performed thereon. In the signal controller 600 according to the present exemplary embodiment, the input image signals R, G and B are input to the ACC processor 620 from the DCC processor and the ACC processor 620 performs ACC processing on the input image signals R, G and B.

The DCC processor 610 according to the present exemplary embodiment corrects the current image signal G(n), which is the image signal for one frame for an arbitrary pixel PX, based on the previous image signal G(n−1), which is an image signal for the previous frame of the pixel PX, to create a corrected current image signal.

The ACC processor 620 performs ACC processing on the input signal. The ACC processor 620 according to the present exemplary embodiment of performs ACC processing on the output of the DCC processor. The ACC processor 620 may perform the ACC processing on the signal based on the ACC LUT 670. According to the present exemplary embodiment, the ACC processor 620 may perform the ACC processing on the input image signals R, G, and B.

The algorithm computing unit 630 generates a second DCC LUT based on the first DCC LUT 650 and the ACC LUT 670. The algorithm computing unit 630 performs second DCC processing on the input signal based on the second DCC LUT.

The image output unit 640 outputs a signal received from the algorithm computing unit 630. The image output unit 640 according to the present exemplary embodiment may perform DCC processing on the input signal based on the third DCC LUT 660. When a motion picture is reproduced on the liquid crystal display based on an input signal, a color tracking phenomenon may occur where a residual image may be displayed during a current frame due to the image of the previous frame. The image output unit 640 according to the present exemplary embodiment may perform DCC processing on the input signal based on the third DCC LUT 660 when color tracking occurs. In this case, the third DCC LUT 660 is used to make minute corrections to the image signal. The third DCC LUT 660 may be stored in advance based on an experiment or calculation.

In the first DCC LUT 650 and the third DCC LUT 660, correction data for a pair of signals including the previous image signal and the current image signal G(n−1) and G(n) is stored.

A reference correction signal of the first DCC LUT 650 and the third DCC LUT 660 is a value which may be determined and stored based on an experimental result.

The ACC LUT 670 includes color correction data for input image signals R, G, and B for every primary color.

Figure 4:
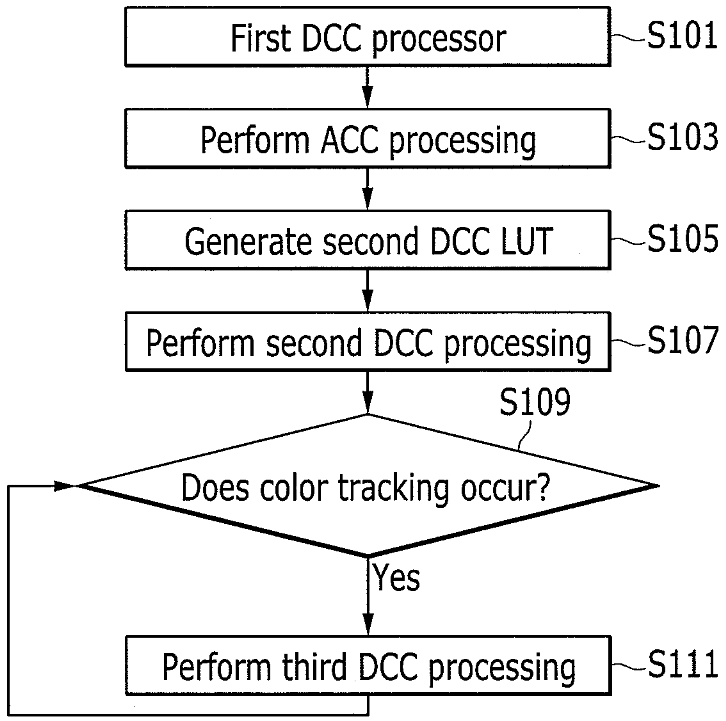
FIG. 4 is a flowchart of an image signal modifying method according to an exemplary embodiment.

FIG. 4 is a flowchart of an image signal modifying method according to an exemplary embodiment of the described technology.

Referring to FIG. 4, the image signal modifying method according to an exemplary embodiment will be described. According to the present exemplary embodiment, an image signal modifying method will be described for when overdriving is performed to a high gray level from a low gray level.

In step S101, the DCC processor 610 performs DCC processing on the input image signals R, G and B. The DCC processor 610 may perform the DCC processing on the signal based on the first DCC LUT 650.

In step S103, the ACC processor 620 performs ACC processing on the signal output from the DCC processor 610. The ACC processor 620 may perform the ACC processing on the signal based on the ACC LUT 670.

In step S105, the algorithm computing unit 630 generates the second DCC LUT based on the first DCC LUT 650 and the ACC LUT 670. A process for generating the second DCC LUT by the algorithm computing unit 630 will be described below.

In step S107, the algorithm computing unit 630 performs DCC processing on the input signal based on the second DCC LUT. The algorithm computing unit 630 according to an exemplary embodiment receives the ACC processed signal and performs second DCC processing on the ACC processed input signal based on the second DCC LUT.

In step S109, the image output unit 640 determines whether color tracking occurs in the second DCC processed signal.

If color tracking occurs in the second DCC processed signal, in step S111, the image output unit 640 performs third DCC processing on the second DCC processed signal based on the third DCC LUT.

Next, referring to FIGS. 5 and 6, a second DCC processing method according to an exemplary embodiment of the described technology will be described.

Figure 5:
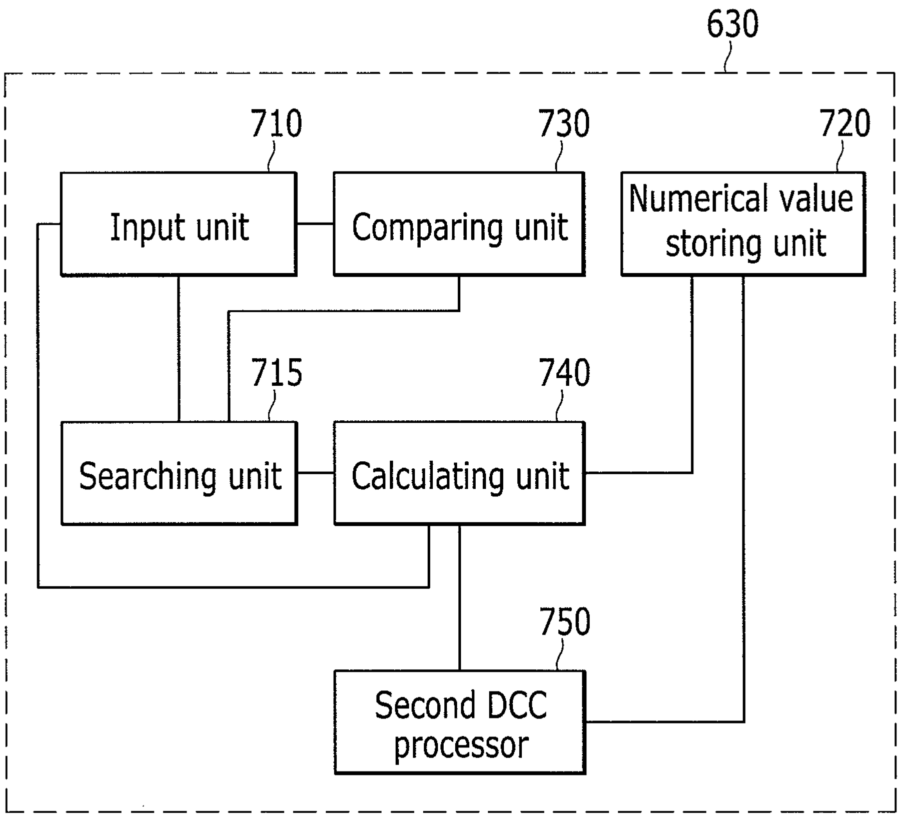
FIG. 5 is a block diagram of an algorithm computing unit according to an exemplary embodiment.

FIG. 5 is a block diagram illustrating an algorithm computing unit according to an exemplary embodiment.

Referring to FIG. 5, an algorithm computing unit 630 according to an exemplary embodiment will be described.

The algorithm computing unit 630 includes an input section 710, a searching unit 715, a numerical value storing unit (or a memory) 720, a comparing unit 730, a calculating unit 740, and a second DCC processor 750. Components illustrated in FIG. 5 are not all essential. An algorithm computing unit 630 having more or less components may also be implemented.

The input unit 710 inputs specific numerical values to a DCC target gray (DTG, hereinafter, abbreviated as DTG), an ACC LUT gray (ALT, hereinafter, abbreviated as ALT), a previous image gray (PIG), A, and F. A and F according to the present exemplary embodiment are constants.

The searching unit 715 searches for an ALT corresponding to a DTG.

The numerical value storing unit 720 stores specific numerical values in the DTG, the ALT, the PIG, A, and F. Further, the numerical value storing unit 720 may store the second DCC LUT.

The comparing unit 730 compares specific values of DTG, ALT, PIG, A, and F with each other.

The calculating unit 740 calculates F based on numerical values stored in the specific values DTG, ALT, PIG, A, or F. F according to an exemplary embodiment is a data value corresponding to the current DTG in the second DCC LUT.

The second DCC processor 750 performs second DCC processing on a signal which is input to the algorithm computing unit based on the generated second DCC LUT. According to an exemplary embodiment, the second DCC processor 750 may use a result calculated by the calculating unit 740 rather than the second DCC LUT stored in the numerical value storing unit 720 to perform the second DCC processing.

Figure 6:
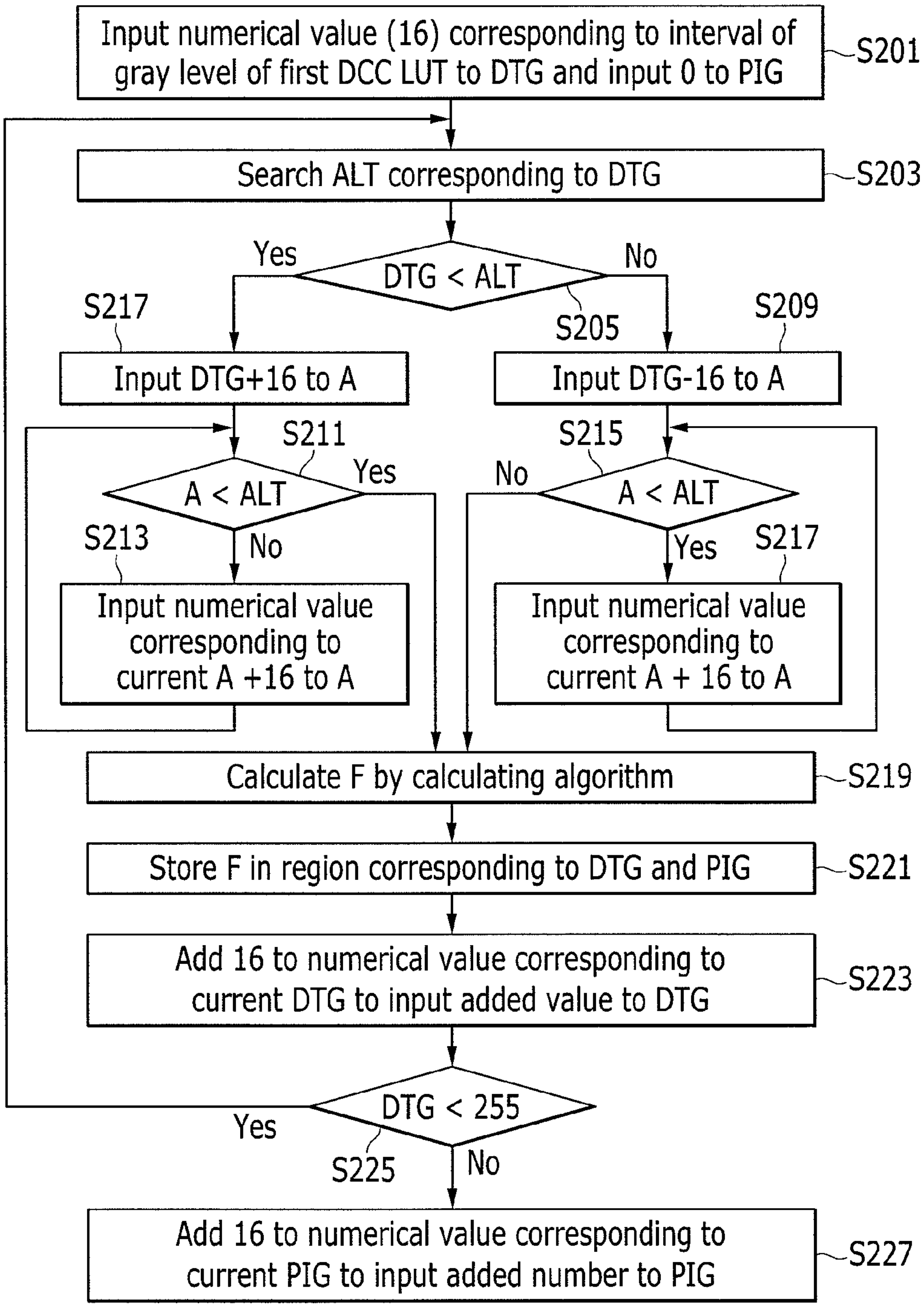
FIG. 6 is a flowchart of a second DCC LUT generating method according to an exemplary embodiment.

FIG. 6 is a flowchart illustrating a second DCC LUT generating method according to an exemplary embodiment.

In step S201, the input unit 710 inputs the gray level interval of the first DCC LUT to the current DTG and inputs zero to the PIG. According to some embodiments, the gray level interval of the first DCC LUT is 16. The DTG according to an exemplary embodiment is a specific gray level of G(n) of the first DCC LUT. In other words, the DTG is a specific gray level which is a target gray level for when it is overdriven in G(n−1). The PIG according to the present exemplary embodiment is a specific gray level of G(n−1) of the first DCC LUT. In other words, the PIG refers to a gray level of a specific image signal in the previous image signals.

Next, Table 1 is an example of the first DCC LUT 650.

TABLE 1

| | Gn − 1 | | | | | | | | | | | | | | | | | |
|---|---|---|---|---|---|---|---|---|---|---|---|---|---|---|---|---|---|---|
| | 0 | 0 | 16 | 32 | 48 | 64 | 80 | 96 | 112 | 128 | 144 | 160 | 176 | 192 | 208 | 224 | 240 | 255 |
| G(n) | 0 | 0 | 0 | 0 | 0 | 0 | 0 | 0 | 0 | 0 | 0 | 0 | 0 | 0 | 0 | 0 | 0 | 0 |
| | 16 | 55 | 16 | 5 | 2 | 0 | 0 | 0 | 0 | 0 | 0 | 0 | 0 | 0 | 0 | 0 | 0 | 0 |
| | 32 | 120 | 76 | 32 | 21 | 20 | 16 | 11 | 9 | 7 | 5 | 3 | 2 | 1 | 1 | 1 | 1 | 1 |
| | 48 | 138 | 104 | 73 | 48 | 40 | 38 | 35 | 30 | 26 | 23 | 19 | 18 | 16 | 10 | 8 | 7 | 6 |
| | 64 | 155 | 117 | 94 | 68 | 64 | 54 | 48 | 39 | 33 | 29 | 25 | 22 | 19 | 17 | 14 | 12 | 11 |
| | 80 | 170 | 142 | 110 | 92 | 86 | 80 | 79 | 66 | 55 | 50 | 36 | 30 | 29 | 23 | 20 | 18 | 16 |
| | 96 | 179 | 154 | 133 | 115 | 112 | 108 | 96 | 89 | 80 | 69 | 56 | 48 | 41 | 37 | 34 | 31 | 25 |
| | 112 | 190 | 170 | 157 | 138 | 132 | 125 | 119 | 112 | 106 | 101 | 96 | 80 | 71 | 58 | 49 | 40 | 38 |
| | 128 | 210 | 184 | 176 | 163 | 157 | 145 | 143 | 139 | 128 | 121 | 119 | 115 | 101 | 91 | 76 | 63 | 57 |
| | 144 | 222 | 212 | 201 | 191 | 184 | 181 | 174 | 162 | 154 | 144 | 136 | 135 | 126 | 120 | 105 | 90 | 81 |
| | 160 | 231 | 220 | 215 | 210 | 205 | 200 | 194 | 187 | 179 | 170 | 160 | 153 | 152 | 149 | 136 | 118 | 112 |

TABLE 1-continued

| Gn − 1 | | | | | | | | | | | | | | | | | |
|---|---|---|---|---|---|---|---|---|---|---|---|---|---|---|---|---|---|
| 0 | 0 | 16 | 32 | 48 | 64 | 80 | 96 | 112 | 128 | 144 | 160 | 176 | 192 | 208 | 224 | 240 | 255 |
| 176 | 238 | 230 | 227 | 220 | 215 | 213 | 208 | 201 | 194 | 191 | 185 | 176 | 171 | 167 | 157 | 150 | 141 |
| 192 | 244 | 238 | 237 | 235 | 234 | 233 | 230 | 220 | 215 | 213 | 205 | 201 | 192 | 191 | 185 | 175 | 169 |
| 208 | 247 | 244 | 241 | 239 | 238 | 237 | 236 | 235 | 233 | 228 | 224 | 221 | 213 | 208 | 203 | 202 | 202 |
| 224 | 252 | 252 | 251 | 251 | 250 | 250 | 247 | 245 | 242 | 241 | 238 | 235 | 232 | 228 | 224 | 221 | 219 |
| 240 | 255 | 255 | 255 | 255 | 255 | 255 | 254 | 253 | 253 | 253 | 249 | 247 | 246 | 245 | 242 | 240 | 236 |
| 255 | 255 | 255 | 255 | 255 | 255 | 255 | 255 | 255 | 255 | 255 | 255 | 255 | 255 | 255 | 255 | 255 | 255 |

Referring to Table 1, the gray level of the previous image signal G(n−1) is a gray level between 0 and 255 in the first DCC LUT and the gray level of the current image signal G(n) is a gray level between 0 and 255. An interval between the gray levels of the previous image signal G(n−1) and the current image signal Gn is 16. Further, according to the present embodiment, the gray levels are 8 bit numbers. In the present embodiment, the gray levels of the current image signal G(n) and the gray levels of the previous image signal G(n−1) are between gray level 0 and 255, the interval between the gray levels of the current image signal G(n) and the previous image signal G(n−1) is 16, and the gray levels are 8 bit numbers, however, the described technology is not limited thereto and may be applied to a different gray level range and a different gray level interval.

In step S203, the searching unit 715 searches for the ALT corresponding to the DTG in the ACC LUT 670.

Hereinafter, the ACC LUT 670 for the red pixel (Red) will be described as an example. However, the described technology is not limited thereto, and may be applied to green pixels (Green) or blue pixels (Blue).

The following Table 2 only represents a part of the gray levels included in the ACC LUT 670 for the red pixel (Red).

TABLE 2

| Gray | LUT_R |
|---|---|
| 0 | 0.0 |
| 1 | 3.4 |
| 2 | 5.9 |
| 3 | 9.8 |
| 4 | 13.0 |
| 5 | 15.6 |
| 6 | 18.6 |
| 7 | 20.4 |
| 8 | 22.8 |
| 9 | 24.4 |
| 10 | 26.0 |
| 11 | 27.5 |
| 12 | 28.8 |
| 13 | 30.4 |
| 14 | 31.8 |
| 15 | 33.2 |
| 16 | 34.8 |
| 17 | 36.1 |
| 18 | 37.7 |

The ALT according to the present exemplary embodiment is a data value in the ACC LUT 670 corresponding to a gray level which is equal to the numerical value of the DTG.

For example, if 16 is input to the DTG, in Table 2, the ALT is 34.8 which corresponds to gray level 16.

In step S205, the comparing unit 730 determines whether the DTG is smaller than the ALT.

If the DTG is smaller than the ALT, in step S207, the input unit 710 adds 16 (the gray level interval of the first DCC LUT) to the current DTG and inputs the result to A. If the DTG is not smaller than the ALT, in step S209, the input unit 710 subtracts 16 (the gray level interval of the first DCC LUT) from the current DTG and inputs the result to A.

When the DTG is smaller than ALT, in step S211, the comparing unit 730 determines whether the current A is smaller than the ALT.

If the current A is smaller than the ALT, in step S213, 16 (an interval of a gray level of the first DCC LUT) is added to the current A and the result is input to A again. If the current A is not smaller than the ALT, in step S219, the calculating unit 740 calculates a value using an algorithm based on the current DTG and the current A.

When the DTG is not smaller than the ALT, in step S215, the comparing unit 730 determines whether the current A is smaller than the ALT.

If the current A is not smaller than the ALT, in step S217, the value obtained by subtracting 16 (the gray level interval of the first DCC LUT) from the current A is input to A again If the current A is smaller than the ALT, in step S219, the calculating unit 740 calculates a value using an algorithm based on the current DTG and the current A. In other words, when the DTG is smaller than the ALT, the DTG is incremented by the gray level interval of the first DCC lookup table until it becomes larger than the ALT, and when the DTG is not smaller than the ALT, the DTG is decremented by the gray level interval of the first DCC lookup table until it becomes smaller than the ALT. The calculating unit 740 then calculates a value based on an algorithm.

The algorithm is performed in accordance with Equation 1.

$$F=\{A-(\text{gray level interval of the first } DCC\ LUT)\}+\{(B-C)*(ALT-DTG)\}/\{\text{gray level of the first } DCC\ LUT\} \quad \text{Equation 1}$$

(in Equation 1, F is a data value in the second DCC LUT corresponding to the current DTG, A is a value that is the DTG incremented by the gray level interval of the first DCC LUT until larger than the ALT when the DTG is smaller than the ALT and a value that is the DTG decremented by the gray level interval of the first DCC LUT until it is smaller than the ALT when the DTG is not smaller than the ALT, B is a data value in the first DCC LUT 650 corresponding to A, C is a data value in the first DCC LUT 650 corresponding to A-16, the ALT is a data value in the ACC LUT 670 corresponding to the gray level which is equal to the numerical value of the current DTG, and the DTG is a current gray level which is a target in the previous image signal when it is overdriven.)

According to the present exemplary embodiment, in Equation 1, the gray level interval of the first DCC LUT is 16.

In step S221, the numerical value storing unit 720 stores F in a region of the second DCC LUT corresponding to the current DTG and the current PIG.

In step S225, the input unit 710 adds the gray level interval of the first DCC LUT to a numerical value of the current DTG and inputs the result to the DTG.

The comparing unit 730 determines whether the DTG is smaller than 255, and if the DTG is smaller than 255, in step S227, the searching unit 715 finds an ALT corresponding to the DTG again.

If the DTG is not smaller than 255, the input unit 710 adds the gray level interval of the first DCC LUT to the numerical value which is stored in the current PIG and inputs the result to the PIG and then repeats the above processes S203 to S227, again.

According to the present exemplary embodiment, the algorithm computing unit 630 repeats the processes S201 to S227 to calculate all data of the second DCC LUT. Further, the processes 5201 to S227 may be applied to a green pixel (Green) or a blue pixel (Blue) and the corresponding ACC LUTs.

While the disclosed technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An image signal modifying device, comprising:

a first dynamic capacitance compensation (DCC) lookup table configured to store first DCC data;

an adaptive color correction (ACC) lookup table configured to store ACC data;

a DCC processor configured to perform first DCC processing on an input image signal based at least in part on the first DCC data;

an ACC processor configured to perform ACC processing on the image signal output from the DCC processor based at least in part on the ACC data; and an algorithm computing unit configured to perform an algorithm based at least in part on the ACC data and the first DCC data to generate a second DCC lookup table configured to store second DCC data, wherein the algorithm computing unit is further configured to perform second DCC processing on the image signal output from the ACC processor based at least in part on the second DCC data.

2. The image signal modifying device of claim 1, wherein the algorithm computing unit is further configured to perform the algorithm based at least in part on i) a current gray level which is a target in a previous image signal when it is overdriven (DTG) and ii) a data value stored in the ACC lookup table corresponding to a gray level which is equal to a numerical value of the DTG (ALT).

3. The image signal modifying device of claim 1, wherein the algorithm computing unit is further configured to perform the algorithm based at least in part on $$F=\{A-(a\text{ gray level interval of the first }DCC\text{ lookup table})\}+\{(B-C)*(ALT-DTG)\}/\{\text{the gray level interval of the first }DCC\text{ lookup table}\} \quad \text{Equation 1}$$

(in Equation 1, the DTG is a current gray level which is a target in a previous image signal when it is overdriven, the ALT is a data value stored in the ACC lookup table corresponding to a gray level which is equal to a numerical value of the DTG, if the DTG is smaller than the ALT, A is the DTG incremented by the gray level interval until the DTG becomes larger than the ALT and, if the DTG is not smaller than the ALT, A is the DTG decremented by the gray level interval table until the DTG becomes smaller than the ALT, B is a data value stored in the first DCC lookup table corresponding to A, C is a data value stored in the first DCC lookup table corresponding to a gray level of a numerical value obtained by subtracting 16 from A, and F is a data value stored in the second DCC lookup table corresponding to the DTG.

4. The image signal modifying device of claim 3, wherein the algorithm computing unit includes:

an input unit configured to provide a plurality of specific numerical values as an initial value of the DTG, a gray level of the previous image signal (PIG), or the A;

a searching unit configured to search for the ALT in the ACC lookup table;

a comparing unit configured to compare the DTG or the A with the ALT;

a calculating unit configured to calculate F based at least in part on Equation 1; and a memory configured to store the calculated F in a region of the second DCC lookup table corresponding to the DTG and the PIG, wherein the searching unit is further configured to search the first DCC lookup table for the B and the C.

5. The image signal modifying device of claim 4, wherein the calculating unit is further configured to perform the algorithm based at least in part on Equation 1, and wherein the algorithm is further configured to: i) if the DTG is smaller than the ALT, increment the DTG by the gray level interval until the incremented value is larger than the ALT, or ii) if the DTG is not smaller than the ALT, decrement the DTG by the gray level interval until the decremented value is smaller than the ALT.

6. The image signal modifying device of claim 1, further comprising:

a third DCC lookup table configured to store third DCC data; and an output unit configured to output the third DCC data and the second DCC processed input image signal, wherein the output unit is further configured to i) determine whether color tracking occurs in the second DCC processed image signal, and if the color tracking occurs, ii) perform third DCC processing on the second DCC processed image signal based at least in part on the third DCC data.

7. An image signal modifying method, comprising:

performing first dynamic capacitance compensation (DCC) processing on an input image signal based at least in part on first DCC data stored in a first DCC lookup table;

performing adaptive color correction (ACC) processing on the DCC processed input image signal based at least in part on ACC data stored in an ACC lookup table;

inputting a gray level interval of the first DCC lookup table to a current gray level which is a target in a previous image signal when it is overdriven (DTG) and inputting 0 to a gray level of the previous image signal (PIG);

searching for a data value in the ACC lookup table corresponding to a gray level which is equal to a numerical value of the DTG (ALT);

performing an algorithm based at least in part on the DTG, the ALT, and data values of the first DCC lookup table;

generating a second DCC lookup table that stores second DCC data based at least in part on the algorithm; and performing second DCC processing on the ACC processed input image signal based at least in part on the second DCC data.

8. The image signal modifying method of claim 7, wherein the performing of the algorithm is based at least in part on Equation 1

$$F=\{A-(\text{gray level interval of the first } DCC \text{ lookup table})\}+\{(B-C)*(ALT-DTG)\}/\{\text{gray level interval of the first } DCC \text{ lookup table}\} \quad \text{Equation 1}$$

(in Equation 1, the DTG is the current gray level which is the target in the previous image signal when it is overdriven, the ALT is the data value stored in the ACC lookup table corresponding to the gray level which is equal to the numeral value of the DTG, if the DTG is smaller than the ALT, is A is the DTG incremented by the gray level interval until larger than the ALT and, if the DTG is not smaller than the ALT, A is the DTG decremented by the gray level interval until smaller than the ALT, B is a data value stored in the first DCC lookup table corresponding to the A, C is a data value stored in the first DCC lookup table corresponding to a gray level of a numerical value obtained by subtracting 16 from the A, and F is a data value stored in the second DCC lookup table corresponding to the DTG).

9. The image signal modifying method of claim 8, wherein the performing the algorithm further comprises: i) if the DTG is smaller than the ALT, incrementing the DTG by the gray level interval until the incremented value is larger than the ALT, or ii) if the DTG is not smaller than the ALT, decrementing the DTG by the gray level interval the decremented value is smaller than the ALT.

10. The image signal modifying method of claim 7, further comprising:

determining whether color tracking occurs in the second DCC processed input image signal; and if the color tracking occurs, performing third DCC processing on the second DCC processed input image signal based at least in part on a third DCC lookup table.

11. The image signal modifying method of claim 8, wherein the generating further includes:

storing the calculated F as a data value in the second DCC lookup table corresponding to the DTG and the PIG.

12. The image signal modifying method of claim 11, wherein the storing of the calculated F further includes:

adding the gray level interval to the numerical value of the DTG;

determining whether the value obtained by the adding exceeds 255; and if the value obtained by the adding does not exceed 255, performing the algorithm again which includes inputting the value obtained by the adding to the DTG.

13. The image signal modifying method of claim 12, wherein the storing of the calculated F further includes:

when the value obtained by the adding exceeds 255, performing the algorithm again which includes inputting a value obtained by adding the gray level interval to the numerical value of the PIG to the PIG.

14. The image signal modifying method of claim 13, wherein the generating of the second DCC lookup table is performed when the ACC LUT is one of Red, Green, and Blue.

15. An image signal modifying device, comprising:

a first dynamic capacitance compensation (DCC) lookup table configured to store first DCC data;

an adaptive color correction (ACC) lookup table configured to store ACC data;

a DCC processor configured to perform first DCC processing on an input image signal based at least in part on the first DCC data;

an ACC processor configured to perform ACC processing on the image signal output from the DCC processor based at least in part on the ACC data; and an algorithm computing unit configured to i) generate a second DCC lookup table configured to store second DCC data based at least in part on the first DCC data and the ACC data, and ii) perform second DCC processing on the image signal output from the ACC processor based at least in part on the second DCC data.

16. The image signal modifying device of claim 15, wherein the algorithm computing unit further comprises:

an input unit configured to initialize a current gray level which is a target in a previous image signal when it is overdriven (DTG) and a gray level of the previous image signal (PIG), a searching unit configured to search for a data value stored in the ACC lookup table corresponding to a gray level which is equal to a numerical value of the DTG (ALT), a calculating unit configured to generate values for the second DCC lookup table;

a memory configured to store the values generated by the searching unit in the second DCC lookup table.

17. The image signal modifying device of claim 16, wherein the calculating unit is further configured to perform one of the following:

if the DTG is smaller than a data value in the ACC lookup table corresponding to a gray level which is equal to a numerical value of the DTG (ALT), increment the DTG by a gray level interval of the first DCC lookup table until the incremented value is larger than the ALT; and if the DTG is not smaller than the ALT, decrement the DTG by the gray level interval until the decremented value is smaller than the ALT.

18. The image signal modifying device of claim 15, further comprising:

a third DCC lookup table configured to store third DCC data; and an output unit configured to output the third DCC data and the second DCC processed input image signal, wherein the output unit is further configured to i) determine whether color tracking occurs in the second DCC processed image signal, and if the color tracking occurs, ii) perform third DCC processing on the second DCC processed image signal based at least in part on the third DCC data.

* * * * *